United States Patent
Bradley et al.

(10) Patent No.: US 11,087,365 B1
(45) Date of Patent: Aug. 10, 2021

(54) CACHING SELECTED DATA FOR USE IN REAL-TIME CONTENT SELECTION

(71) Applicant: Amazon Technologies, Inc., Seattle, WA (US)

(72) Inventors: Andrew J. Bradley, Edinburgh (GB); Andrew Douglas Birkett, Edinburgh (GB); Christopher de Beer, Edinburgh (GB); Shane Girish, Edinburgh (GB); Anthony Richard McBryan, West Lothian (GB); Sebastiano Merlino, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/457,615

(22) Filed: Mar. 13, 2017

(51) Int. Cl.
*G06Q 30/02* (2012.01)
*H04L 29/08* (2006.01)

(52) U.S. Cl.
CPC ..... *G06Q 30/0275* (2013.01); *G06Q 30/0277* (2013.01); *H04L 67/2842* (2013.01)

(58) Field of Classification Search
CPC .................. G06Q 30/00–0284; H04L 67/2842
See application file for complete search history.

(56) References Cited

U.S. PATENT DOCUMENTS

| | | | |
|---|---|---|---|
| 7,792,706 | B2 | 9/2010 | Tirumalareddy et al. |
| 7,991,757 | B2 | 8/2011 | Kane, Jr. |
| 8,010,407 | B1 | 8/2011 | Santoro et al. |
| 8,019,642 | B2 | 9/2011 | Sellinger et al. |
| 8,229,861 | B1 | 7/2012 | Trandal et al. |
| 9,407,975 | B2 * | 8/2016 | Grusd ............... H04N 21/8583 |
| 9,672,554 | B2 | 6/2017 | Dumon et al. |
| 10,460,348 | B1 | 10/2019 | Peddinti et al. |
| 10,825,064 | B1 | 11/2020 | Bradley et al. |
| 2001/0054008 | A1 * | 12/2001 | Miller ............... G06Q 30/0225 |
| | | | 705/26.1 |

(Continued)

OTHER PUBLICATIONS

Wenzhong Chen, Caching Dynamic Content on the Web, Jun. 2003 pp. 50-55 (Year: 2003).*

(Continued)

*Primary Examiner* — Abhishek Vyas
*Assistant Examiner* — Darnell A Pouncil
(74) *Attorney, Agent, or Firm* — Eversheds Sutherland (US) LLP

(57) ABSTRACT

Systems, methods, and computer-readable media are disclosed for caching selected data for use in real-time content selection. In one embodiment, an example method may include determining a first set of user identifiers for users that are eligible to be presented with content associated with a first product identifier, the first set having a first number of user identifiers, determining a second set of user identifiers for users that are eligible to be presented with content associated with a second product identifier, the second set having a second number of user identifiers, and determining that the first number is greater than the second number. Example methods may include determining first content associated with the first product identifier, determining first product information associated with the first product identifier, and caching the first content and the first product information at a server instead of second content associated with the second product identifier.

18 Claims, 8 Drawing Sheets

(56) References Cited

U.S. PATENT DOCUMENTS

| | | |
|---|---|---|
| 2002/0161673 A1 | 10/2002 | Lee et al. |
| 2005/0004880 A1 | 1/2005 | Musgrove et al. |
| 2005/0289039 A1 | 12/2005 | Greak |
| 2008/0103876 A1 | 5/2008 | Armstrong et al. |
| 2008/0154765 A1 | 6/2008 | Wolfe |
| 2008/0195475 A1 | 8/2008 | Lambert et al. |
| 2009/0030786 A1 | 1/2009 | Rosler et al. |
| 2011/0251875 A1 | 10/2011 | Cosman |
| 2011/0264551 A1 | 10/2011 | Lau |
| 2012/0036023 A1 | 2/2012 | Das et al. |
| 2012/0246003 A1 | 9/2012 | Hart et al. |
| 2013/0325636 A1 | 12/2013 | Carter et al. |
| 2014/0258032 A1 | 9/2014 | Psota et al. |
| 2015/0206109 A1 | 7/2015 | Caldwell et al. |
| 2017/0017971 A1 | 1/2017 | Moreau et al. |
| 2017/0323380 A1 | 11/2017 | Alberti et al. |
| 2020/0342066 A1* | 10/2020 | Lewis ................ G06F 16/9574 |

OTHER PUBLICATIONS

Colleen Connolly-Ahem, Accounts, Media, and Culture: An International Impression Management Experiment (Year 2004); 20 pages.
Pepsi Cola-Soda Radio 1998, Ebay (Year: 2019); 2 pgs.
Pepsi is Launching an Android Phone in China, The Verge, Vox Media, LLC; (Year 2016); 4 pgs.
Pepsi Instant Camera, Ebay (2019); 2 pgs.
Puru Kulkarni, et al. "Importance-aware Bloom Filer for Set Membership Queries in Streaming Data", (2013); 10 pgs.

* cited by examiner

CACHING SELECTED DATA FOR USE IN REAL-TIME CONTENT SELECTION

BACKGROUND

Content may be presented on electronic devices to users such that users can consume the content. Users may consume or interact with certain content while other content may not be consumed or interacted with. In some instances, content for presentation to a user or at a particular device may be selected from among a number of available pieces of content. Such selections may be restricted to certain times or may have certain time limits within which content must be selected for presentation, so as to avoid lag in presentation at a device. Accordingly, caching data may reduce an amount of time needed to select content. Further, selecting relevant content may improve an effectiveness of content when presented to certain users.

Figure 1:
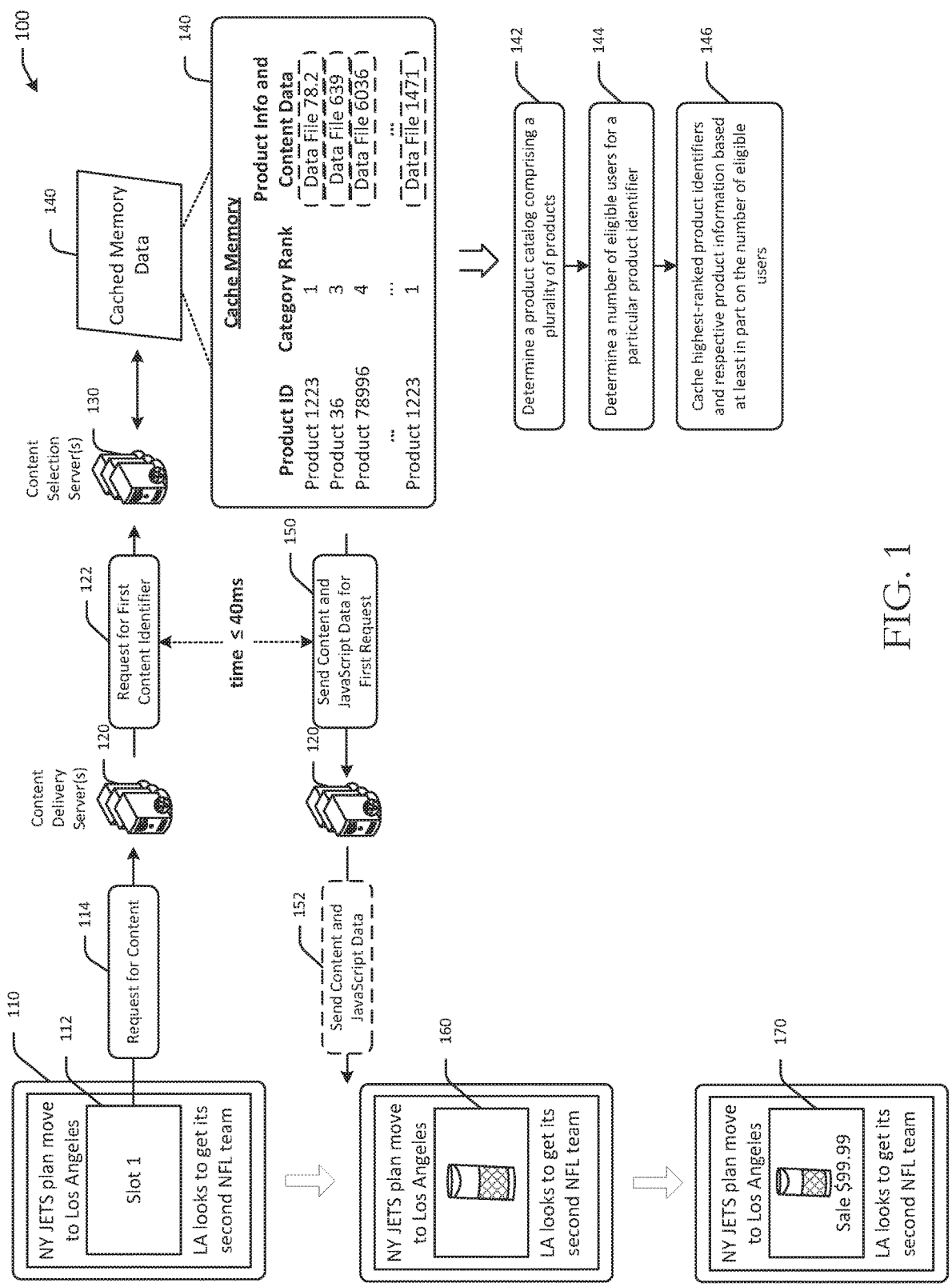
FIG. 1 is a hybrid system and process diagram for caching selected data for use in real-time content selection in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may include content such as text, images, videos, audio, and other content. Some content may include images of particular products, as well as additional product related information. Content may be targeted to specific users or groups of users. For example, targeting criteria for content that includes a product such as a smartphone may indicate that the content is to be presented to users in geographic locations where the smartphone may be available for purchase, as well as users that meet certain demographic, income, age or age range, and/or user preference criteria. Other targeting criteria may be used.

In some instances, a user may browse, in a digital environment, one or more products. For example, a user may look at a particular product while contemplating a purchase of the product. Certain user interactions with the product or with information associated with the product may indicate a level of interest and/or a user intent regarding the product. For example, if a user navigates to product reviews of the product, the user may be interested in purchasing the product. If the user spends several minutes at the product reviews, that may be an indication that the user read one or more of the product reviews and that the user is interested in purchasing the product. In another example, if the user adds the product to a digital shopping cart, or if the user searches for discount codes for the product, such user interactions may reflect a level of interest in the product. Therefore, presenting content to the user that is related to the product may result in a conversion or in the user making a purchase of the product. Some content may have or be associated with targeting criteria that includes users that have previously viewed or otherwise interacted with a product webpage, a product information page, or other product related data.

To present content at digital devices and/or to particular users, an auction process or another process may be used to determine content that is to be presented. For example, a user may be browsing, on a device, digital content related to sports news, weather, videos, or other content. An available content slot may be present at the content, where a content impression may be presented, for example, by a third party content source. Content slots may be available in mobile applications, during video or audio playback, and in other digital content.

In some instances, a portion of an auction for presenting content, such as a bidding process, may be limited to a relatively short length of time, such as about 40 milliseconds or less. In one example, entities may have a time limit of about 40 milliseconds after receiving a bid request, or a request to bid on a content slot, in which to select content and determine a bid amount for sending in response to the bid request. Accordingly, selecting content for presentation to a user that is relevant to the user, and determining a bid amount may be highly time sensitive, particularly when or if there is a large number or large amount of candidate content from which to select content for presentation. Other embodiments may generate responses within about 50 milliseconds, or 60 milliseconds, or 70 milliseconds, or 100 milliseconds, or about 130 milliseconds.

Embodiments of the disclosure may be used for real-time bidding, so as to select content or product identifiers that are relevant to a user and/or a user device, and determine a bid amount if needed within a time limit. Certain embodiments may select content and determine bid amounts within about 40 milliseconds or less. Embodiments of the disclosure may reduce response times and latency to bid requests for real-time bidding. Responses to bid requests may be determined using certain cached content. In one or more embodiments, content may be cached based at least in part on geographic regions, probabilities that certain content will be served, and/or other factors. Some embodiments may include prefetching or predetermining user-specific content and related orders of presentation. One or more embodiments may select or determine content or product identifiers that are to be cached based at least in part on a number of factors. One or more embodiments may render, or cause to be rendered, dynamic ads that can be modified in real-time by executing client-side applications at render. Certain embodiments may be used to select content or product identifiers from many (e.g., millions or tens of millions, etc.) candidate content or product identifiers.

By using the cached data, dynamic content, and user feedback described herein, responses to bid requests may be determined within timeframes of less than about 40 milliseconds. For example, a determination and/or selection of content or product identifiers can be made within a relatively short timeframe (e.g., within about 40 milliseconds), regardless of the size or number of potential products or content from which the selection is to be made. Some embodiments may use cached content, dynamic content rendered at user devices, and/or user feedback (e.g., for selection of content to present or to cache, etc.).

This disclosure relates to, among other things, systems, methods, computer-readable media, techniques, and methodologies for caching selected data for use in real-time content selection. Embodiments may cache data based at least in part on geographic location or other factors, and may generate responses to bid requests within about 40 milliseconds. Certain embodiments may cause dynamic content to be rendered at user devices, and may provide functionality for user engagement and/or dislike of presented content.

Referring to FIG. 1, an example use case 100 for caching selected data for use in real-time content selection is depicted in accordance with one or more embodiments of the disclosure. A user may be using a device 110 to access digital content. For example, the user may use the device 110 to access news, videos, images, articles, or other digital content. The device 110 may request content from one or more content delivery servers 120 over one or more wired or wireless networks. For example, the device 110 may be a smartphone and may request digital content from the content delivery server 120 over a WiFi or cellular network. Specifically, the device 110 may send a request for content at a first communication 114. The content delivery server 120 may receive the request for content from the device 110. The content that is requested by the device 110 may have one or more content delivery slots, or portions of the content at which a third party (e.g., in some instances a party other than a content publisher, etc.) may present content in addition to the requested content. For example, a video may be presented before or after presentation of the requested content, an image or certain content may be presented in line with the requested content, and the like. The requested content in FIG. 1 may include an interstitial available content delivery slot 112, labeled Slot 1.

At a second communication 122, the content delivery server 120 may request content and/or a content identifier from one or more content selection servers 130 for an available content delivery slot. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. The content selection server 130 may be one of a number of, or multiple, servers that receive the request for the content identifier from the content delivery server 120. The request for the content identifier from the content delivery server 120 may include a request for the content that was requested by the user device and/or a request for third-party or additional content. The second communication 122 may be a bid request, or a request for connected entities to bid on the opportunity to present content at a particular content delivery slot. The second communication 122 may include contextual information, such as a website of the content that was requested by the device 110, time and date information, etc., user information, such as a user identifier for the user that is operating or otherwise associated with the device, location information for the content delivery slot (e.g., for videos or audio content, a location could represent a playback position, such as before or after the requested content, etc.), and other information. A time limit within which a response to the second communication 122 may be received by the content delivery server 120 may be 40 milliseconds in the example of FIG. 1.

The content selection server 130 may be in communication with cached memory data 140 that may be stored locally or remotely at one or more high-speed datastores. The cached memory data 140 may include one or more product identifiers, one or more content identifiers, one or more ranking values (e.g., category ranking values, user-specific ranking values, etc.) for product or content identifiers, and/or may optionally include product information and/or content data. In some instances, content data, such as image files, video files, text files, and other data may be stored at the cache memory data 140. Data stored at the cached memory data 140 may be selected based at least in part on geographic location, predicted user interactions, previously presented content, content rankings, and/or other factors. In the example of FIG. 1, the cached memory data 140 may include a set of product identifiers that are associated with respective category rankings. The category rankings may be rankings of product identifiers within certain product categories. For example, Product 36 may be a DSLR camera and may be ranked third overall in a DSLR camera category. Rankings may be based at least in part on popularity, user ratings, and/or other factors. The cached memory data 140 may include product information and content data that may be associated with respective product identifiers or content identifiers. For example, Data File 78.2 may be associated with product identifier 1223. The respective data files may include creative materials, such as images, video, audio, and the like, product information, such as pricing, user ratings, options or features, and other product information, and may include different or additional information. Some data files may include prioritization data that is indicative of a priority of presentation for the creative materials and/or the product information (e.g., for dynamic content, pricing information may be presented before rating information, or a video may be presented before an image, etc.).

To determine which data and/or product identifiers to store at the cached memory data 140, the content selection server 130, or a related server, may perform one or more operations. In one embodiment, at a first operation 142, the content selection server 130 may determine a product catalog comprising a plurality of products. The content selection server 130 may determine or identify a product catalog or a content catalog that may include content or product identifiers that can be presented to any users. The product catalog may be a catalog or a listing of one or more products or services that are associated with content and/or content delivery campaigns, or that are otherwise available for use by users.

At a second operation 144, the content selection server 130 may determine a number of eligible users for a particular product identifier. For example, for a product identifier of a DSLR camera, there may be a set of users that are eligible to be presented the content or the product identifier of the DSLR camera. The users may have recently interacted with the product identifier or related webpage (e.g., clicked on a link, added the camera to a digital shopping cart, read product reviews, etc.), the users may satisfy targeting criteria associated with the particular product identifier (e.g., certain age range, certain demographic, certain location, etc.), or may otherwise be determined to be eligible for presentation of content associated with the product identifier. The content selection server 130 may rank the product identifiers based at least in part on the number of eligible users for the respective product identifiers. For example, a first product identifier may have 1,000,000 eligible users that can be presented with content related to the first product identifier, while a second product identifier may have 500 eligible users. The first product identifier may therefore be ranked higher than the second product identifier, because it may be more likely that the first product identifier will be presented to a user than the second product identifier.

In some embodiments, the content selection server 130 may determine a probability of conversion or a probability of action for specific users and in some cases, for specific users for specific content. Such probabilities may be used for rankings or ranking scores. Probability of conversion or probability of action may be the probability that serving one impression of certain content for a given bid request or user will lead to a conversion or a click or other desired action. Probabilities may be determined, for example, by logistic regressions, redundancy models, or other models. The models used to determine probability may consider several inputs, including user-specific information (e.g., demographic, purchase history, etc.), and contextual information (e.g., time of day, website content, keywords, etc.). Embodiments described herein may dynamically weight inputs of a probability model based on factors other than user-specific features. For example, a previous determination that a user is in the market to purchase electronics may not change hourly, and therefore, some probability models implemented by servers described herein may cache pre-calculated user information or analysis of user information, such that a content selection server does not have to calculate user-specific information or make related determinations in real-time in response to a bid request.

At a third operation 146, the content selection server 130 may cache the highest ranked or some of the highest ranked product identifiers and the respective product information based at least in part on the number of eligible users. Therefore, the cached data may have a relatively high probability of being served or selected for presentation to users, since the cached data may be associated with the highest number of users. The content selection server 130 may actively cache content and/or product identifiers based at least in part on a number of eligible users, determinations of users that have made purchases and may no longer be eligible, predicted user interactions, predicted device interactions, and the like.

The content selection server 130 may use the cache memory data 140 to determine a response to the second communication 122, such as a response to a bid request. In some embodiments, even if a user is eligible for multiple product identifiers and/or content identifiers, the content selection server 130 may select content from the cache memory data 140, so as to reduce a response time. To determine a response, the content selection server 130 may perform one or more operations. For example, the bid request or the second communication 122 may include contextual information, such as user attributes for the user, chronological information, geographic location information, time of day, contextual information for the content around the available content delivery slot 112, and/or other contextual information. Based at least in part on the bid request or the second communication 122, a set of one or more candidate content may be determined, for example, by the content selection server(s) 130. Candidate content may be determined from content that is available for potential delivery. In some instances, candidate content may be based at least in part on targeting criteria associated with respective content. For example, targeting criteria for certain content may indicate that the user for which the content delivery slot is available does not match the targeting criteria, and as a result, the content may not be candidate content for that particular content delivery slot. User information, in this example, may be determined based at least in part on contextual information and/or other information associated with the bid request.

The content selection server 130 may extract user information, contextual information, and/or other information from the bid request or the second communication 122, and may use the extracted information to select content for presentation to the user for which the bid request is provided. The content selection server 130 may select a content or product identifier from the cache memory data 140, so as to reduce a length of time in responding to the second communication 122. In some embodiments, the content selection server 130 may select a content or a product identifier and generate a response to the second communication 122 within about 40 milliseconds or less.

The content selection server 130 may select content and/or a product identifier based at least in part on historical user interaction data for a particular user in some embodiments. Historical user interaction data may include clickstream data for a user or group of related users. Clickstream data may include data related to user browse interactions, such as clicks, views, timings, and other information. The historical user interaction data may include information related to user interactions such as purchases, clicks, views, hovers, likes, shares, comments, and other user interactions.

Within about 40 milliseconds, the content selection server 130 may select a content or a product identifier from the cached memory data 140 and may optionally determine a bid amount for the available content delivery slot 112. The content selection server 130 may send a third communication 150 to the content delivery server 120. The third communication 150 may be a response to the second communication 122, or a bid request, and may include a content or a product identifier, a content file, a bid amount and/or JavaScript data for the first request. The JavaScript data may be a set of computer-executable instructions that can be executed by the user device 110 to perform certain actions, such as dynamic rendering of content at the available content delivery slot 112. Other embodiments may use different scripts or languages for computer-executable instructions that may be sent to the content delivery server 120 and/or the device 110. An elapsed time between receiving the bid request and sending the response may be less than or equal to about 40 milliseconds.

The content delivery server 120 may receive the third communication 150 within about 40 milliseconds of sending the second communication 122, and may perform or facilitate an auction process to determine a winning bid amount. The content delivery server 120 may determine that the bid amount from the content selection server 130 is the winning bid amount.

At optional fourth communication 152, the content delivery server 120 may send the content and the JavaScript data that was received from the content selection server 130 to the user device 110. In other embodiments, the content delivery server 120 may send an indication of the content, such as a link to the content or a content identifier, to the user device 110 instead of content files and/or the JavaScript data.

The user device 110 may receive the fourth communication 152 and may present or cause an impression of the content to be rendered at the available content delivery slot 112, or Slot 1. As illustrated in the example of FIG. 1, an image of an audio streaming device may be rendered at the content delivery slot in a second user interface 160 at the user device. The JavaScript data may be executed by the user device 110 to dynamically render the content. For example, the JavaScript data may include an order of presentation for content that is included in the content file. The content file may include a product image or video, pricing information, rating information, etc. The user device 110 may continually render information until there is no space or until there is a predetermined amount of white space or unused space remaining in the content slot.

For example, at the second user interface 160, as the user navigates through the article, the user device 110 may render the image of the audio streaming device. The JavaScript data may be executed by the user device 110 to determine that there is unused space available at the content delivery slot, and therefore, the user device 110 may render pricing information at the slot, in addition to the image.

At a third user interface 170, the image of the audio streaming device and the pricing information may be rendered at the content slot. The user device 110 may determine that there is not enough space left to render rating information and may cease rendering of additional content. The user may interact with the content, which may include a link to purchase the content or other product information. The content may therefore be dynamically rendered and may include different content at different devices and/or be based at least in part on device orientation and display time. For example, if the content slot is presented for a certain length of time (e.g., while the user is consuming surrounding content, etc.), the user device 110 may cycle through information by replacing the pricing information, while in other embodiments the content may be static after the slot is filled or determined to have insufficient space remaining for additional content.

The systems, methods, computer-readable media, techniques, and methodologies for caching selected data for use in real-time content selection may result in optimal and/or improved selection of content or product identifiers for presentation to specific users. In some embodiments, certain data may be selected for storing in cache memory, which may be used and/or applied to select content in real-time, while preventing selection of content that may no longer be relevant to a user because, for example, the user has already made a purchase of an item or a related item (e.g., bought a competitor's product, etc.).

Example embodiments of the disclosure provide a number of technical features or technical effects. For example, in accordance with example embodiments of the disclosure, certain embodiments of the disclosure may generate dynamic content impressions that are rendered at user devices, select content for caching based at least in part on a likelihood of use, replace cached content based at least in part on user interactions, and the like. As a result, content or product identifiers from catalogs or databases of tens of millions of products can be selected in a relatively short time frame, due to increased computing efficiency and improved use of computer resources. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
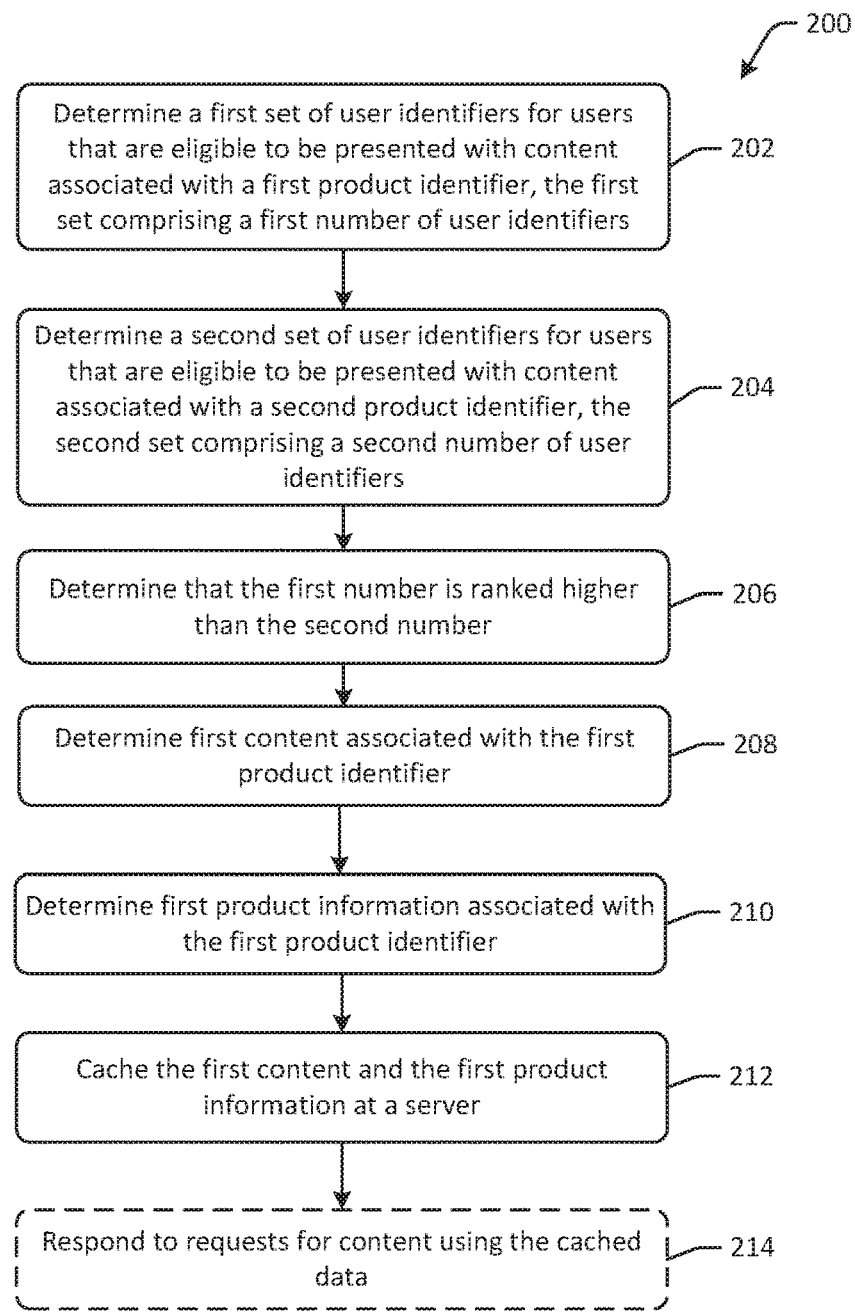
FIG. 2 is an example process flow diagram for caching selected data for use in real-time content selection in accordance with one or more embodiments of the disclosure.

Referring to FIG. 2, an example process flow 200 for caching selected data for use in real-time content selection in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2.

At block 202 of the process flow 200, a first set of user identifiers for users that are eligible to be presented with content associated with a first product identifier may be determined, where the first set includes a first number of user identifiers. In one embodiment, computer-executable instructions of one or more cache selection module(s) stored at a server may be executed to determine a first set of user identifiers that are eligible to be presented with certain content. The cache selection modules may be used to determine a first number of user identifiers that are eligible for presentation. Eligibility may be determined based at least in part on targeting criteria, user-specific historical interactions, previously presented content, historical purchases, and/or other factors. For example, a first user identifier for a first user, a second user identifier for a second user, and a third user identifier for a third user may be determined to be eligible for targeting of first content comprising the first product identifier. The product identifier may be selected from a product catalog that includes multiple product identifiers for different products.

At block 204 of the process flow 200, a second set of user identifiers for users that are eligible to be presented with content associated with a second product identifier may be determined, where the second set includes a second number of user identifiers. In one embodiment, computer-executable instructions of one or more cache selection module(s) stored at a server may be executed to determine a second set of user identifiers that are eligible to be presented with certain content. The cache selection modules may be used to determine a second number of user identifiers that are eligible for presentation. Eligibility may be determined based at least in part on targeting criteria, user-specific historical interactions, previously presented content, historical purchases, and/or other factors. For example, while the first user identifier, the second user identifier, and the third user identifier may be eligible for targeting of the first product identifier, only the first user identifier of the three example user identifiers may be eligible for targeting of content associated with the second content identifier. Accordingly, in this example, the first product identifier may have three eligible users, while the second product identifier may have one eligible user.

At block 206 of the process flow 200, the first number may be determined to be ranked higher than the second number. For example, computer-executable instructions of one or more ranking module(s) stored at a server may be executed to determine a ranking or an order of the respective number of eligible users for the product identifiers and/or content identifiers. The product identifiers may be ranked in ascending order, in one example, based at least in part on a respective number of eligible users. In some embodiments, a determination may be made as to whether the first number is greater than the second number, rather than a ranking process. Accordingly, the first number may be determined to be greater than the second number.

At block 208 of the process flow 200, first content associated with the first product identifier may be determined. The first content may include images, videos, links, data, audio, and other content. For example, computer-executable instructions of one or more content selection module(s) stored at a server may be executed to determine first content that is associated with a particular product identifier. The content may include creative materials such as product and/or brand identifiers, such as images, logos, names, ratings, prices, and other information. Creative materials may be generated in different formats, for example, in each format needed for the recommended digital product types. Creative materials may be in any suitable digital format, such as a visual format or an audio format. For an audio format, creative materials may include automatically generated audio segments that may include promotional offers, music, jingles, sounds, and other audio data.

At block 210 of the process flow 200, first product information associated with the first product identifier may be determined. The first product information may include pricing information, ratings information, specification information, and other product information. For example, computer-executable instructions of one or more content selection module(s) stored at a server may be executed to determine first product information that is associated with a particular product identifier.

At block 212 of the process flow 200, the first content and the first product information may be cached at a server. For example, computer-executable instructions of one or more cache selection module(s) stored at a server may be executed to store the first content and/or the first product information at a cache memory device and/or at high speed storage.

At optional block 214, the cached data may be used to respond to requests for content. For example, computer-executable instructions of one or more content selection module(s) stored at a server may be executed to select content and/or product information from the cached data to respond to content requests and/or bid requests. The cached content may be used for low latency responses to, for example, bid requests. Because the cached data may be relevant to a relatively high number of users, the cached data may be more likely to be used than content that is relevant to fewer users. In some embodiments, the cached content may be used in conjunction with other data to determine bid amounts. For example, bid amounts may be determined based at least in part on information associated with a bid request, such as user information, device information, time of day information, and other factors.

Figure 3:
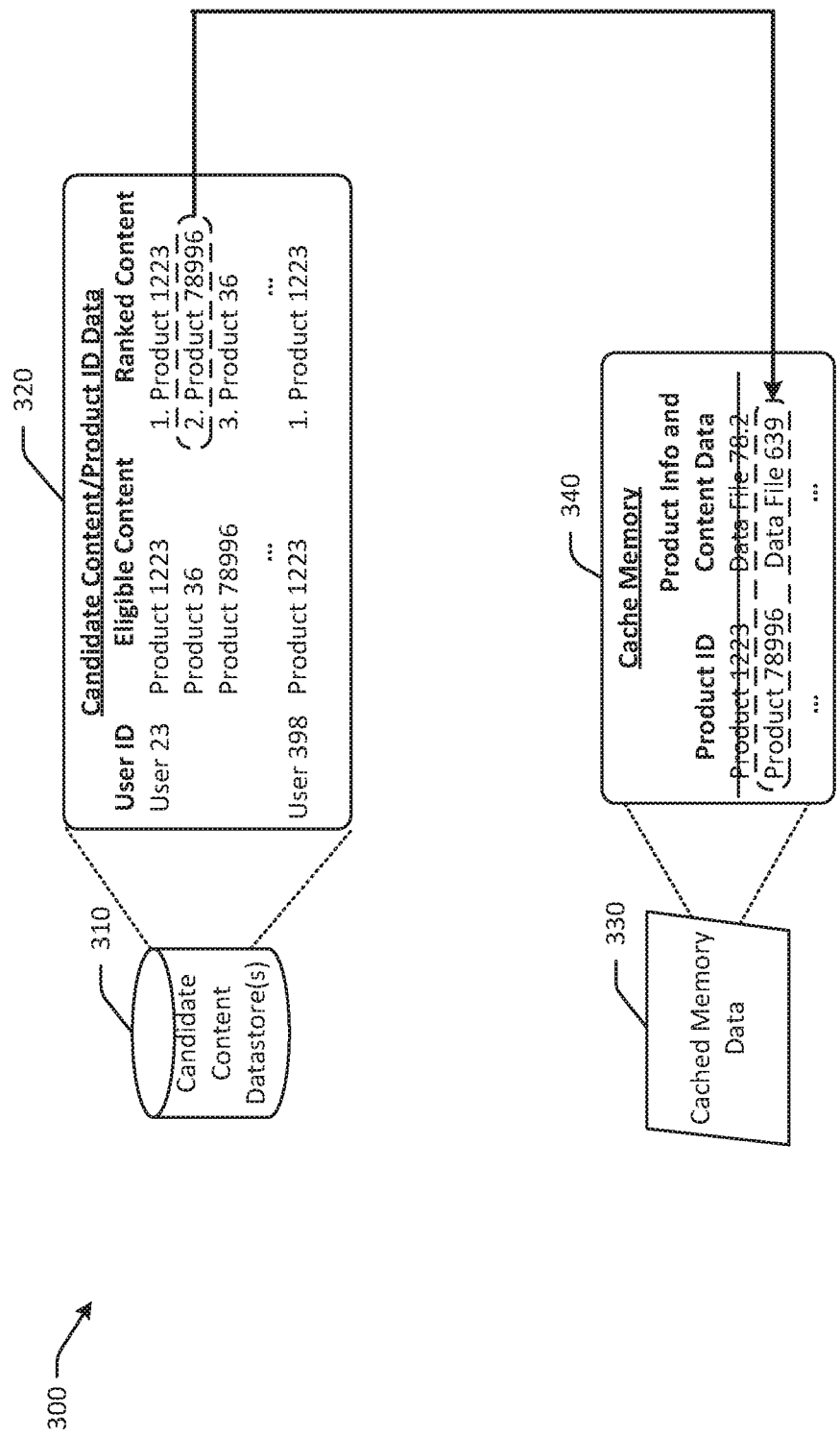
FIG. 3 is an example schematic diagram illustrating a candidate content datastore and cached memory data in accordance with one or more embodiments of the disclosure.

FIG. 3 depicts an example computing environment 300 with a candidate content datastore 310 and cached memory data 330. The candidate content datastore 310 may be in communication with the cached memory data 330. The candidate content datastore 310 may store a set of available content and/or product identifiers. In some instances, the candidate content datastore 310 may have ranking values for a product catalog and/or content identifiers. The candidate content datastore 310 may include candidate content and/or candidate product identifier data 320 for one or more users. The candidate content data 320 may be determined for respective users and may be based at least in part on targeting criteria associated with the content and/or user interaction data for the particular identifier. In some embodiments, the candidate content data 320 may include pre-ranked content for a particular user. As shown in FIG. 3, the candidate content data 320 may include, for respective users, a set of eligible content and/or product identifiers that the user is eligible for, as well as ranking values for the user-specific eligible content. In the illustrated example, User 23 may be eligible for Product 1223, Product 36, and Product 78996, where Product 1223 is ranked first and Product 78996 is ranked second.

The cached memory data 330 may include cache memory 340, which may include a number of product identifiers, and may optionally include associated data files corresponding to the product identifiers. The data files may include creative materials, audio, video, or other content, as well as product information. The cached memory data 330 may be used to send data and/or select content in response to bid requests in a low latency response period.

The cache memory 340 may be updated as content from the cache memory is presented. After a content impression is served to a user, the user may no longer be eligible to receive the same content or related content for a certain amount of time, so as to avoid bombarding the user with the same content repeatedly. As a result, after cached content is presented to users, the number of eligible users for that content may decrease, and second-ranked, or lower ranked, content may have a higher number of eligible users. Therefore, the presented content may be replaced in the cache memory 340 by other content that has a higher number of eligible users. Content in the cache memory 340 may be evaluated for replacement periodically, such as every few hours, every day, or during other time intervals.

In the example of FIG. 3, the Product 1223 identifier may have had a high number of eligible users, and may have been stored in the cache memory 340 with corresponding data file 78.2. However, after being presented to a number of users, the Product 78996 identifier may have a greater number of eligible users and may therefore replace the Product 1223 identifier and related data file in the cache memory 340.

In some embodiments, user-specific rankings may be used to determine or select content that is cached in the cache memory 340. For example, User 23 may have a user-specific ranking of the Product 1223 and its content ranked first, and Product 78996 and its content ranked second. After the content associated with Product 1223 is presented at a device associated with the user identifier of User 23, the content associated with Product 78996 may be cached. User-specific rankings of content or product identifiers may be determined based at least in part on targeting criteria.

Figure 4:
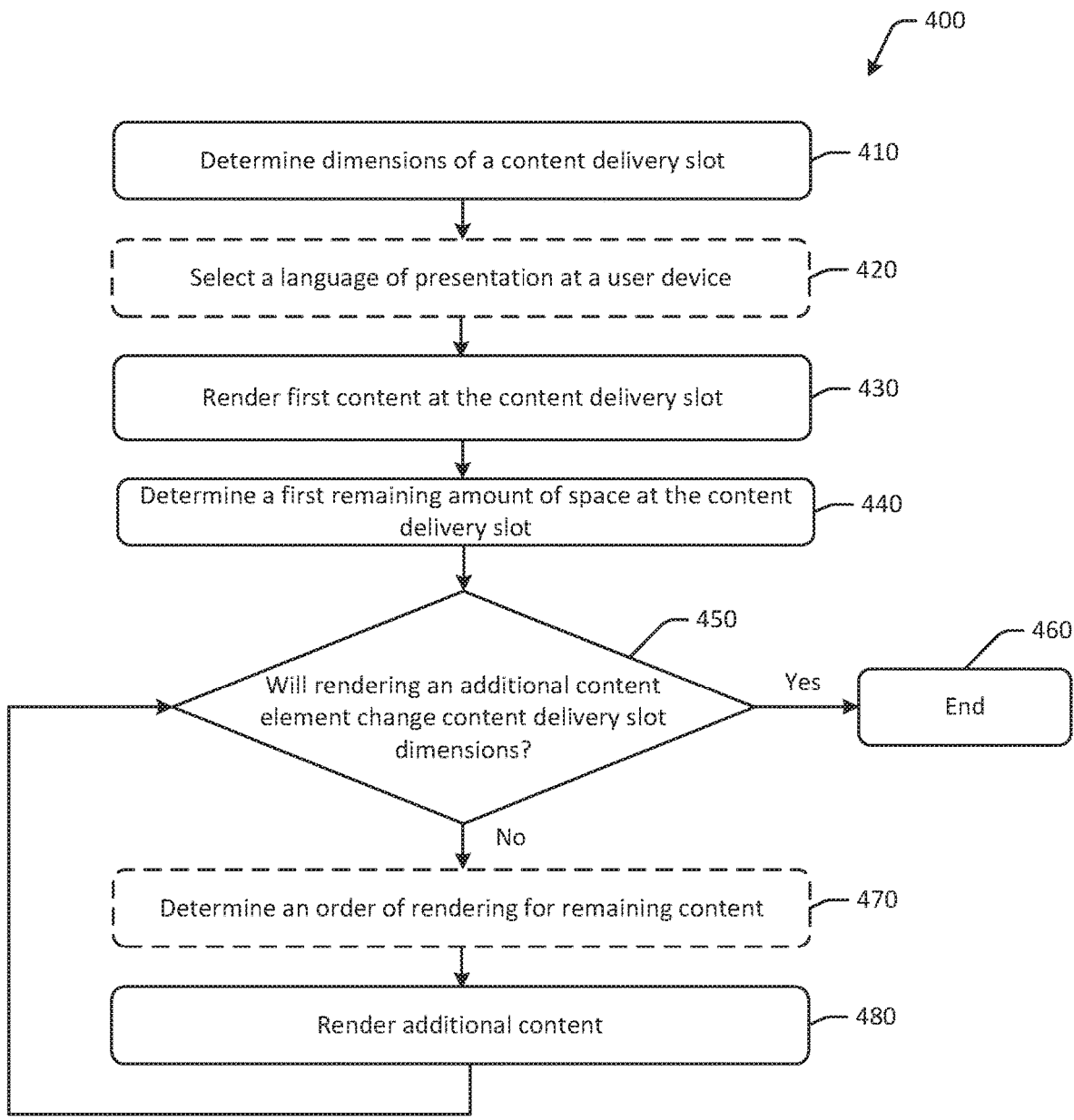
FIG. 4 is an example process flow diagram for dynamically rendering content in accordance with one or more embodiments of the disclosure.

FIG. 4 is an example process flow 400 for dynamically rendering content in accordance with one or more embodiments of the disclosure. Some or all of the operations of FIG. 4 may be performed at a user device in one embodiment, while some or all of the operations of FIG. 4 may be performed by a server in another embodiment. In an example embodiment, the operations of FIG. 4 may be executed by a user device, where the computer-executable instructions are received from a server (e.g., via JavaScript in one example, etc.).

At block 410, computer-executable instructions may be executed by a user device to determine dimensions of a content delivery slot. For example, JavaScript may be executed by a user device to determine pixel dimensions or display dimensions of an available content delivery slot. Dimensions may be determined based at least in part on display layout, device orientation, and other factors.

At optional block 420, computer-executable instructions may be executed by a user device to select a language of presentation at the user device. For example, content to be presented at a content delivery slot may have more than one language that can be presented. The user device may determine or select a language of presentation of the content. Language selection may be determined, for example, based at least in part on a device location or geographic location, browser information, internet protocol addresses, serial numbers, and other factors. Product information associated with content may be available in more than one language, and the user device may select the appropriate language for presentation.

At block 430, computer-executable instructions may be executed by a user device to render the first content at the content delivery slot. The rendered content may be an image, a video, an audio clip, or other content.

At block 440, computer-executable instructions may be executed by a user device to determine a first remaining amount of space at the content delivery slot. For example, after rendering an image, the user device may determine an amount of white space or unused space that remains at the content delivery slot.

At determination block 450, a determination may be made as to whether rendering additional content will change the dimensions of the content delivery slot and/or whether rendering additional content will cause the rendered content to have dimensions greater than or larger than the dimensions of the content delivery slot. If it is determined that rendering additional content and/or inserting a particular content element into the content delivery slot will change the dimensions of the content delivery slot and/or exceed the allotted dimensions, the content element may not be added and another content element may be evaluated or the process flow may end at block 460.

In other embodiments, a determination may be made as to whether there is enough remaining space to render additional content. The remaining space may have to satisfy a threshold, such as a predetermined percentage or a portion of the total content slot area, in order to render additional content. If it is determined that there is not enough remaining space to render additional content, the process flow 400 may end at block 460.

If it is determined that rendering additional content will not change the dimensions of the content delivery slot and/or exceed the allotted dimensions, the process flow may proceed to optional block 470, at which the user device may determine an order of rendering for the remaining content. For example, the available content may include an image, price information, and rating information. The user device may determine that the image is to be presented first, then the rating information is to be presented, and then, space permitting, the price information is to be presented. In other embodiments, if it is determined that there is enough remaining space (e.g., the threshold, if applicable, is satisfied, etc.), then the process flow 400 may proceed to optional block 470

At block 480, computer-executable instructions may be executed by a user device to render the additional content. For example, the user device may render the rating information at the available content slot in the remaining space, such that the image and the rating information are rendered. In some embodiments, font size, image size, and other content characteristics may be manipulated by the user device to create or remove remaining space, or unused space, in a content slot. The process flow 400 may then return to determination block 450 in an iterative process until there is not enough remaining space to render additional content.

Figure 5:
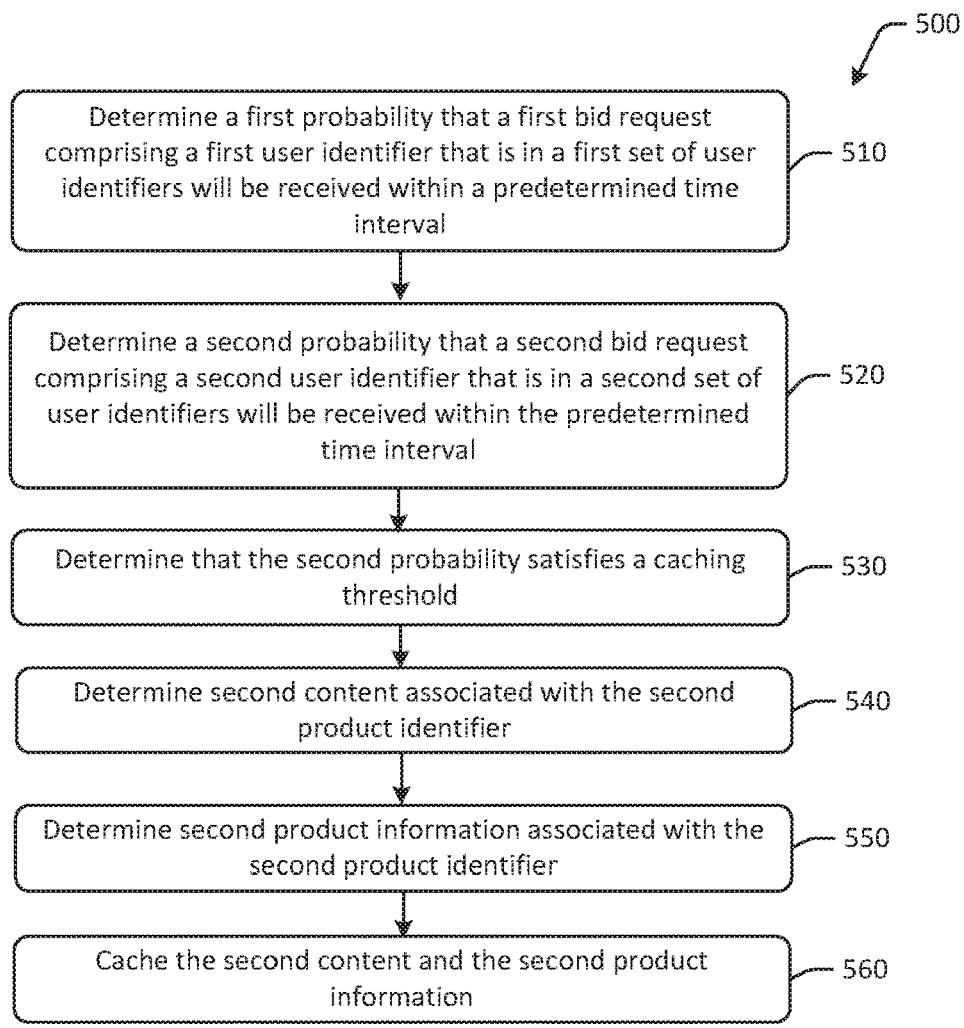
FIG. 5 is an example process flow diagram for caching selected data for use in real-time content selection using probability values in accordance with one or more embodiments of the disclosure.

FIG. 5 depicts an example process flow 500 for caching selected data for use in real-time content selection using probability values in accordance with one or more embodiments of the disclosure. The operations of FIG. 5 may be performed in any order and at least partially concurrently by one or more computer systems.

At block 510, a first probability that a first bid request with a first user identifier that is in a first set of user identifiers will be received within a predetermined time interval may be determined. The probability may be indicative of a likelihood that a bid request for a user that is eligible for certain content will be received within a predetermined time interval. The predetermined time interval may be, for example, a day, a number of hours, or another time interval.

At block 520, a second probability that a second bid request with a second user identifier that is in a second set of user identifiers will be received within the predetermined time interval may be determined. The probability may be indicative of a likelihood that a bid request for a user that is eligible for certain content (that is different from the content of the first set of user identifiers) will be received within the predetermined time interval.

At block 530, it may be determined that the second probability satisfies a caching threshold. The caching threshold may be a minimum probability that a bid request for a user in a certain group of users that are eligible for certain content will be received within the predetermined time interval. The larger the group of eligible users, the more likely a bid request with one of those eligible users may be received within the time interval. The caching threshold may be a percentage value, a numerical value, a range, or another value indicative of a minimum probability.

In some embodiments, the probability that is determined and/or used for the caching threshold may be a probability that certain content will be presented within a predetermined time interval, instead of a probability that a bid request with a user in a certain group or set of users will be received.

At block 540, second content associated with the second product identifier may be determined. Because the second probability satisfies the caching threshold, content associated with the second product identifier may be determined.

At block 550, second product information associated with the second product identifier may be determined. In some embodiments, the second product information may be part of the second content.

At block 560, the second content and the second product information may be cached or stored in cached memory. The process flow 500 may therefore be used to determine a likelihood that a bid request for one or more certain users, or users eligible for certain content, will be received within a predetermined timeframe.

Figure 6:
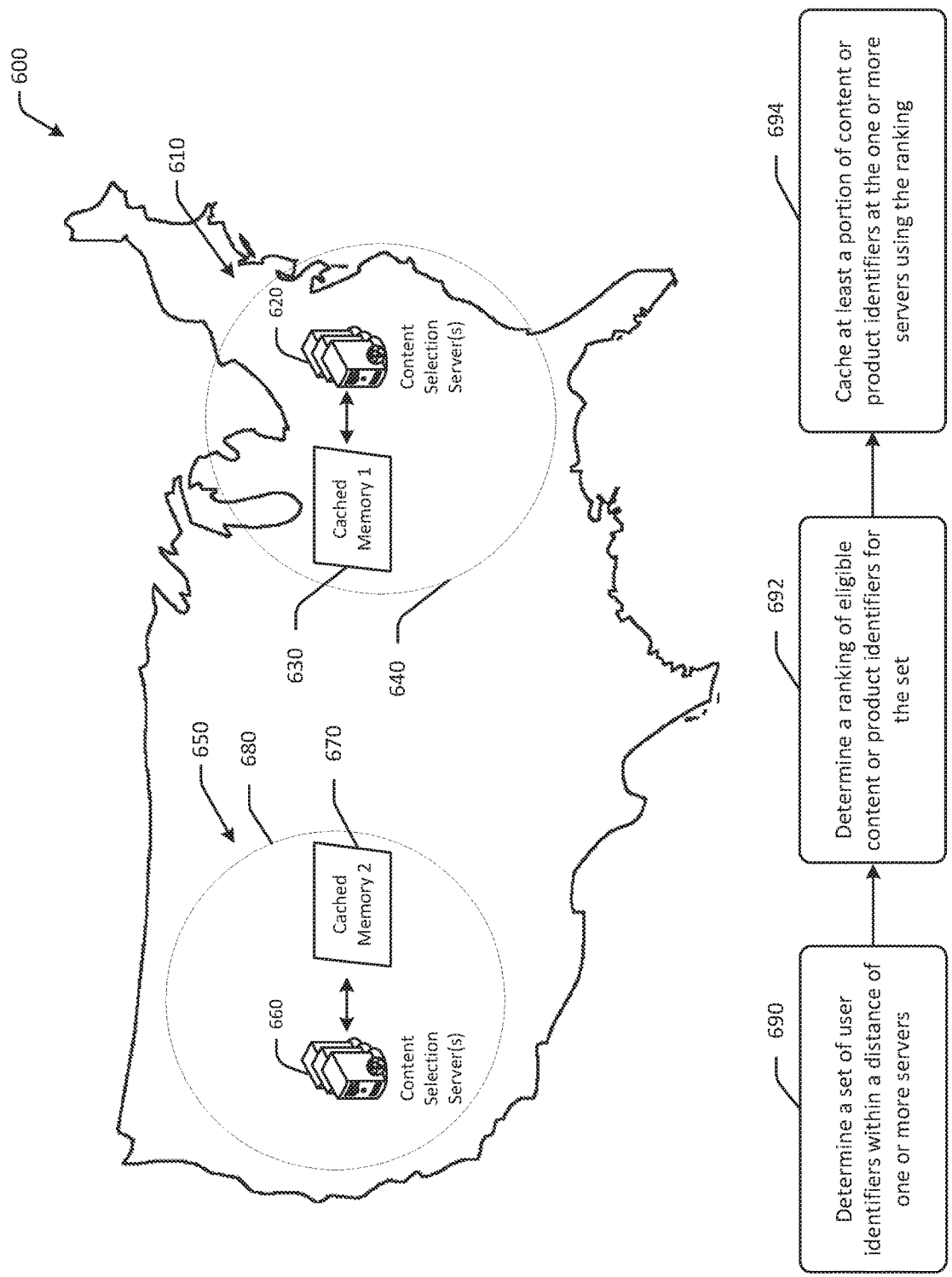
FIG. 6 is an example hybrid system and process flow diagram for determining location-specific content selection in accordance with one or more embodiments of the disclosure.

FIG. 6 is an example hybrid system and process flow diagram 600 for determining location-specific content selection in accordance with one or more embodiments of the disclosure. In some embodiments, multiple cache memories may be available at different content selection servers. For example, content selection servers in different geographic locations may have independent cache memories, which may have different region-specific or location-specific content or product identifiers stored thereon. For example, a first geographic region 610 may be on the East coast of the United States, and a second geographic region 650 may be at a West coast of the United States. The different geographic regions may have different sets of users that are located in the respective geographic regions. The different users may have different preferences and items of interest. For example, users in the second geographic region 650 may enjoy skiing and surfing, while users in the first geographic region 610 may enjoy basketball and other indoor sports. Accordingly, individual cache memories may be used due to the potential differences in the composition of local users.

A first content selection server 620 may be in the first geographic region 610 and may be in communication with a first cached memory 630. The first content selection server 620 may be used to provide content to, or respond to bid requests for, users within a local region 640, for example. If a user is in the local region 640, bid requests for that user may be processed by the first content selection server 620.

A second content selection server 660 may be in the second geographic region 650 and may be in communication with a second cached memory 670. The second content selection server 660 may be used to provide content to, or respond to bid requests for, users within a local region 680, for example. If a user is in the local region 680, bid requests for that user may be processed by the second content selection server 660.

To determine which content should be stored in the respective cache memory devices, one or more of the content selection servers or a related server may perform one or more operations. At a first operation 690, a set of user identifiers within a distance of one or more servers may be determined. For example, the first content selection server 620 may determine a set of user identifiers that are associated with devices located within the local region 640 and/or are associated with addresses within the local region 640. Similarly, the second content selection server 660 may determine a set of user identifiers that are associated with devices located within the local region 680 and/or are associated with addresses within the local region 680.

At operation 692, a ranking of eligible content or product identifiers for the set of users may be determined. Accordingly, content or product identifiers that are most relevant to users within a local region may be determined.

At operation 694, at least a portion of the content or product identifiers at the one or more servers may be cached using the ranking. For example, the top 100 products or content identifiers may be cached at the respective cache memories, because they may be the most likely to be presented to local users.

In some embodiments, a set of geographic region identifiers for respective user identifiers may be determined. Geographic region identifiers may be indicative of a geographic region, a physically closest content selection server, a primary shipping address location, and the like. A most frequently occurring geographic region identifier in the set of geographic region identifiers may be determined, where the most frequently occurring geographic region identifier may be a location that most of the users in the set are associated with. A server that corresponds to the most frequently occurring geographic identifier may be selected to cache content and product information for the local users, where the server is located in a geographic region of the most frequently occurring geographic region identifier. This process may be used to cache content at servers that are selected based on users in the area or having the same or similar geographic location identifiers as the server, and the user's respective preference or eligibility for content.

The embodiment of FIG. 6 may also be used to determine or classify devices or users as active devices/users or inactive devices/users. For example, if a bid request for a user is received at the first content selection server 620, and another bid request is later received for the user at the second content selection server 660, then the user and/or the user device may be classified as an active user/device, since the user has crossed geographic regions. Active classifications may be used to share data, such as cached data related to user preferences, among content selection servers, so that the relevant content can be selected for presentation to the user regardless of where the user is located when content is requested. For example, the first content selection server 620 may determine that a first impression was served at a first device associated with a first user identifier, and may determine that the first user identifier is an active user identifier. The first content selection server 620 may share the impression notification or related data with the second content selection server 660, so that the second content selection server 660 does not present the same impression to the user within a certain timeframe. The second content selection server 660 may also cache subsequent content for the user in the event a bid request for the user is received.

Figure 7:
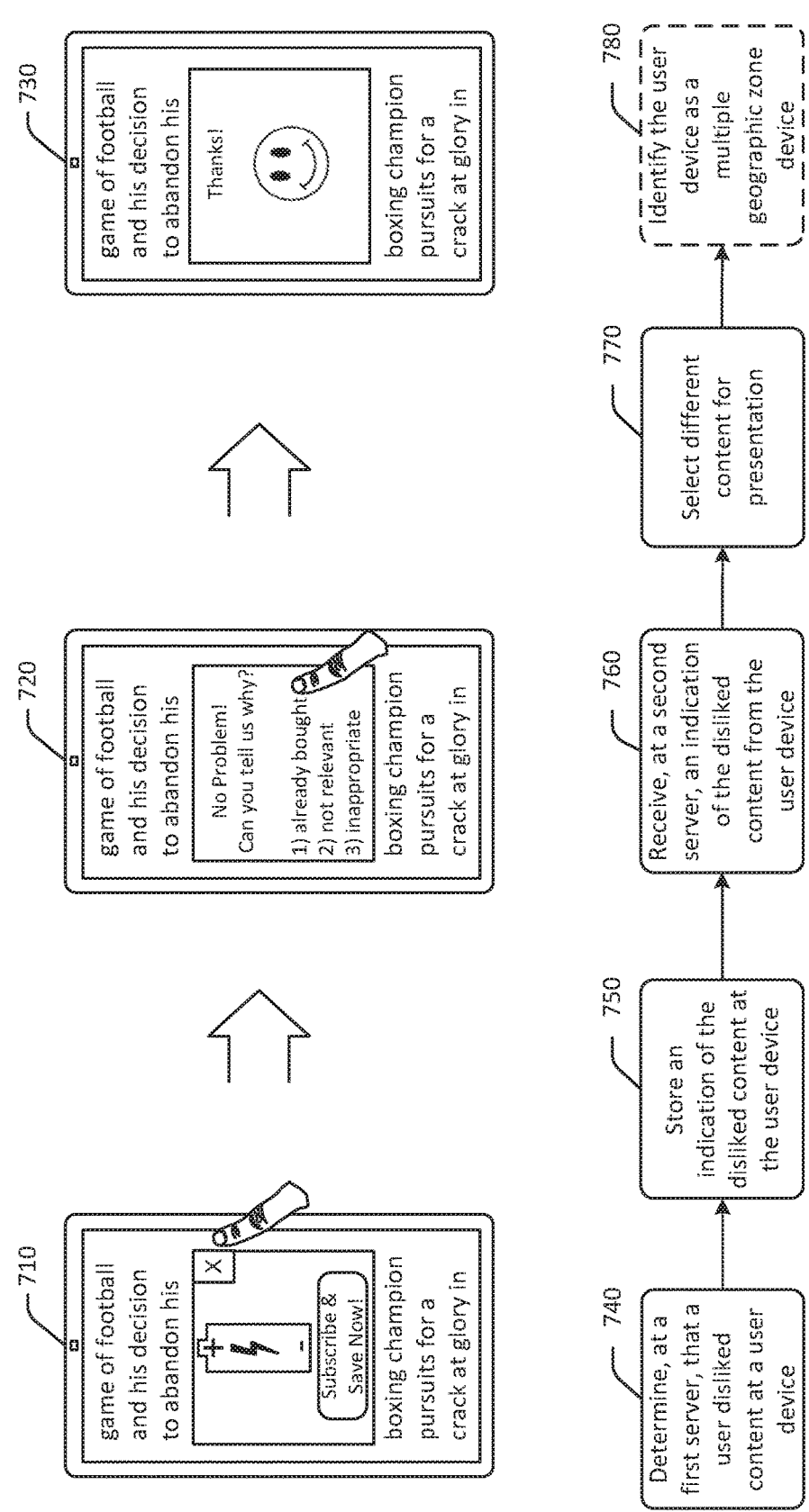
FIG. 7 is an example hybrid system and process flow diagram for determining a user dislike event for content in accordance with one or more embodiments of the disclosure.

FIG. 7 is an example hybrid system and process flow diagram 700 for determining a user dislike event for content in accordance with one or more embodiments of the disclosure. User dislike events may indicate that a user did not like certain content that was presented. User dislike events may be stored with user preferences and may be propagated across content selection servers and/or related users, such as users of the same household.

At a first user interface 710, first content may be presented at a user device. The user may interact with the first content to initiate a dislike event. For example, the user may click an "X" at the first content. At a second user interface 720, a request for an explanation as to why the user disliked the content may be presented. The user may select a reason or input another response. At a third user interface 730, confirmation of the dislike event and/or a fallback image may be presented instead of the first content. The fallback image may be included as part of the content data file.

At operation 740, a first server may determine that the user disliked content at a user device. At operation 750, an indication of the disliked content may be stored at the user device, such as in a cookie file or the like. At operation 760, a second server may receive an indication of the disliked content from the user device. For example, the user device may move from a first geographic location to a second geographic location, and the user device may alert a second server in the second geographic location of the dislike event, so that the second server does not need to track the user's preferences until the user device actually is present in the local region of the second server. At operation 770, different content for presentation may be selected by either the first server or the second server. At optional operation 780, the user device may be identified as a multiple geographic zone or an active device.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
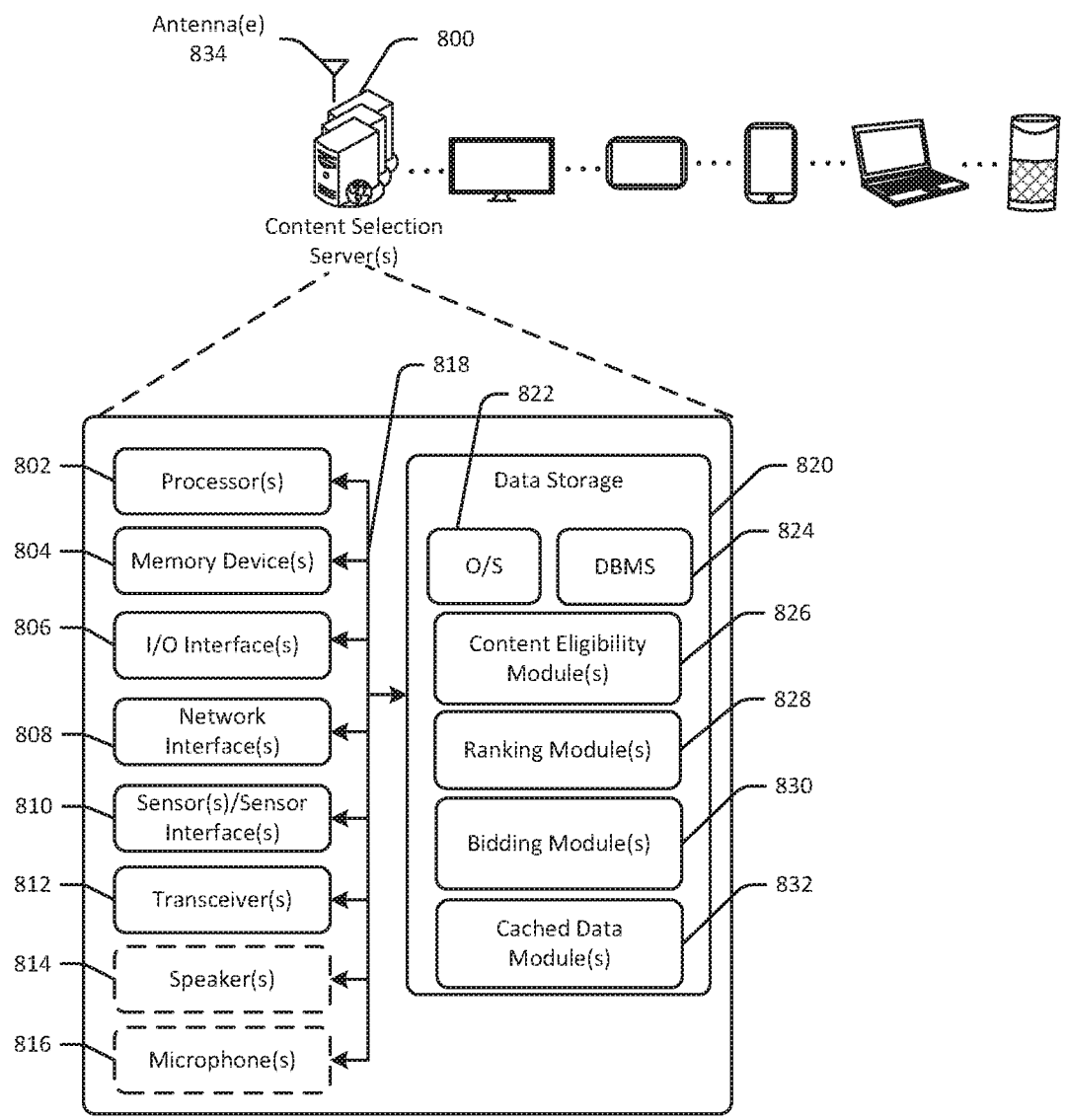
FIG. 8 schematically illustrates an example architecture of a content selection server in accordance with one or more embodiments of the disclosure.

FIG. 8 is a schematic block diagram of one or more illustrative content selection server(s) 800 in accordance with one or more example embodiments of the disclosure. The content selection server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The content selection server(s) 800 may correspond to an illustrative device configuration for the content selection servers or content delivery servers of FIGS. 1-7.

The content selection server(s) 800 may be configured to communicate via one or more networks with one or more servers, user devices, or the like. The content selection server(s) 800 may be configured to determine eligible content, determine user purchase or interaction data, interact with or perform auction bidding operations, select content or product identifiers, and other operations. The content selection server(s) 800 may be configured to deliver or cause delivery of one or more pieces of content and may further be configured to engage in a bidding process for auctions to present content. In some embodiments, a single remote server or a single group of remote servers may be configured to perform more than one type of content delivery functionality.

The content selection server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content selection server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The content selection server(s) 800 may further include one or more buses 818 that functionally couple various components of the content selection server(s) 800. The content selection server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the content selection server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the content selection server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more content eligibility module(s) 826, one or more ranking module(s) 828, one or more bidding module(s) 830, and/or one or more cached data module(s) 832. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the content selection server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, historical data for campaigns, inventory data, campaign performance data, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the content selection server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the content eligibility module(s) 826 may include computer-executable instructions, code, or the like that responsive to execution by one or more of the processor(s) 802 may perform functions including, but not limited to, determining content eligibility for certain users or groups of users, determining users eligible for certain content or product identifiers, determining targeting criteria, determining contextual information, extracting data from bid requests, comparing user data to targeting criteria, and the like.

The ranking module(s) 828 may include computer-executable instructions, code, or the like that responsive to execution by one or more of the processor(s) 802 may perform functions including, but not limited to, determining ranking scores for content identifiers, product identifiers, user identifiers, and other ranking scores, determining ranking values, determining or tracking impression data, selecting content and/or product identifiers for caching, and the like.

The bidding module(s) 830 may include computer-executable instructions, code, or the like that responsive to execution by one or more of the processor(s) 802 may perform functions including, but not limited to, determining bid amounts, determining bid values, facilitating presentation of winning content impressions, and the like.

The cached data module(s) 832 may include computer-executable instructions, code, or the like that responsive to execution by one or more of the processor(s) 802 may perform functions including, but not limited to, selecting data for caching, selecting content or product identifiers from cached data, tracking cached data inventory, and the like.

Referring now to other illustrative components depicted as being stored in the data storage 820, the O/S 822 may be loaded from the data storage 820 into the memory 804 and may provide an interface between other application software executing on the content selection server(s) 800 and the hardware resources of the content selection server(s) 800. More specifically, the O/S 822 may include a set of computer-executable instructions for managing hardware resources of the content selection server(s) 800 and for providing common services to other application programs (e.g., managing memory allocation among various application programs). In certain example embodiments, the O/S 822 may control execution of the other program module(s) to dynamically enhance characters for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content selection server(s) 800 is a mobile device, the DBMS 824 may be any suitable lightweight DBMS optimized for performance on a mobile device.

Referring now to other illustrative components of the content selection server(s) 800, the input/output (I/O) interface(s) 806 may facilitate the receipt of input information by the content selection server(s) 800 from one or more I/O devices as well as the output of information from the content selection server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content selection server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content selection server(s) 800 may further include one or more network interface(s) 808 via which the content selection server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the content selection server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the content selection server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content selection server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the content selection server(s) 800 may include alternate and/or additional hardware, software, or firmware components beyond those described or depicted without departing from the scope of the disclosure. More particularly, it should be appreciated that software, firmware, or hardware components depicted as forming part of the content selection server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a product catalog comprising a plurality of product identifiers for different products;
   determining a first product identifier of the plurality of product identifiers for a first product;
   determining a second product identifier of the plurality of product identifiers for a second product;
   determining a set of user identifiers comprising a first user identifier for a first user, a second user identifier for a second user, and a third user identifier for a third user;
   determining that the first user identifier, the second user identifier, and the third user identifier are eligible for targeting of first content comprising the first product identifier;
   determining that the first user identifier is eligible for targeting of second content comprising the second product identifier;
   caching, based at least in part on a determination that a number of eligible user identifiers for targeting of the first content is greater than a number of eligible user identifiers for targeting of the second content, the first content instead of the second content at a server;
   determining that the first content has been presented to the first user;
   removing, based at least in part on the determination that the first content has been presented to the first user, the first content from the server;
   caching the second content at the server;
   receiving a bid request for a content delivery slot at a webpage, the bid request comprising the first user identifier;
   determining that the first user identifier is eligible for targeting of the first content and the second content;
   determining that the second content is cached at the server;
   sending a response to the bid request, the response to the bid request comprising a bid amount and the second content, wherein an elapsed time between receiving the bid request and sending the response is less than or equal to about 40 milliseconds;
   determining a first probability that a first bid request comprising a first user identifier that is in the first set of user identifiers will be received within a predetermined time interval;
   determining a second probability that a second bid request comprising a second user identifier that is in the second set of user identifiers will be received within the predetermined time interval;
   determining that the second probability satisfies a caching threshold;
   determining second content associated with the second product identifier;
   determining second product information associated with the second product identifier; and
   caching the second content and the second product information at the server.

2. The method of claim 1, wherein the response to the bid request further comprises JavaScript data, wherein the JavaScript data comprises computer-executable instructions that, when executed by a device, cause the device to perform operations comprising:
   determining dimensions of the content delivery slot;
   rendering a product image associated with the second content at the content delivery slot;
   determining that rendering a first additional content element of a product price associated with the second content will not change the dimensions of the content delivery slot;
   rendering the product price in the content delivery slot;
   determining that rendering a second additional content element of a product rating associated with the second content will change the dimensions of the content delivery slot; and
   determining that a remaining amount of space is insufficient to render the product rating.

3. The method of claim 1, further comprising:
   determining a first device associated with the first user identifier and a second device associated with the second user identifier;
   determining that the first device and the second device are associated with a first geographic region;
   determining that a third device associated with the third user identifier is associated with a second geographic region; and
   determining that the server is located in the first geographic region.

4. The method of claim 1, further comprising:
   determining a ranking of content for which the first user identifier is eligible based at least in part on targeting criteria, wherein the first content is ranked higher than the second content.

5. A method comprising:
   determining, by one or more computer processors coupled to at least one memory, a first set of user identifiers for users that are eligible to be presented with content associated with a first product identifier, the first set comprising a first number of user identifiers;
   determining a second set of user identifiers for users that are eligible to be presented with content associated with a second product identifier, the second set comprising a second number of user identifiers;
   determining that the first number is greater than the second number;
   caching, based at least in part on the determination that the first number is greater than the second number, first content associated with the first product identifier at a server instead of second content associated with the second product identifier;
   determining that the first content has been presented to a user associated with a user identifier of the first set;
   removing, based at least in part on the determination that the first content has been presented to a user, the first content from the server;
   caching the second content at the server;
   determining a first probability that a first bid request comprising a first user identifier that is in the first set of user identifiers will be received within a predetermined time interval;
   determining a second probability that a second bid request comprising a second user identifier that is in the second set of user identifiers will be received within the predetermined time interval;
   determining that the second probability satisfies a caching threshold;
   determining second content associated with the second product identifier;
   determining second product information associated with the second product identifier; and caching the second content and the second product information at the server.

6. The method of claim 5, further comprising:
receiving a bid request for a content delivery slot, wherein the bid request comprises a user identifier;
determining that the first set of user identifiers comprises the user identifier; and
sending a response to the bid request comprising the first content and first product information associated with the first product identifier within about 40 milliseconds of receiving the bid request.

7. The method of claim 6, further comprising:
determining that the user identifier is eligible to be presented with second content associated with the second product identifier; and
determining a user-specific ranking of the first content and the second content, wherein the first content is ranked higher than the second content.

8. The method of claim 6, wherein sending the response to the bid request comprising the first content and the first product information within about 40 milliseconds of receiving the bid request comprises sending the response to the bid request comprising the first content, the first product information, and computer-executable instructions that, when executed by a device, cause the device to perform operations comprising:
determining dimensions of the content delivery slot;
rendering the first content at the content delivery slot;
determining a first remaining amount of space in the content delivery slot;
rendering a first portion of the first product information in the content delivery slot;
determining a second remaining amount of space in the content delivery slot; and
determining that the second remaining amount of space is insufficient to render a second portion of the first product information.

9. The method of claim 8, wherein the computer-executable instructions, when executed by the device, further cause the device to perform operations comprising:
determining a device location based at least in part on browser information; and
selecting a language of presentation for the first product information, wherein the first product information comprises information in a plurality of languages.

10. The method of claim 5, further comprising:
determining a set of geographic region identifiers for respective user identifiers in the first set of user identifiers;
determining a most frequently occurring geographic region identifier in the set of geographic region identifiers; and
selecting the server to cache the first content and first product information associated with the first product identifier, wherein the server is located in a first geographic region of the most frequently occurring geographic region identifier.

11. The method of claim 5, further comprising:
determining a user identifier that is in the first set and the second set; and
determining a user-specific ranking of the first product identifier and the second product identifier for the user identifier, wherein the first product identifier is ranked higher than the second product identifier;
wherein the first number of user identifiers comprises a number of user identifiers for which the first product identifier is a highest ranked product identifier.

12. The method of claim 5, further comprising:
determining that a first impression was served at a first device associated with a first user identifier within a predetermined time interval; and
determining that the first user identifier is an active user identifier;
wherein determining the first set of user identifiers for users that are eligible to be presented with content associated with the first product identifier comprises determining a first set of active user identifiers; and
wherein determining the second set of user identifiers for users that are eligible to be presented with content associated with the second product identifier comprises determining a second set of active user identifiers.

13. The method of claim 5, further comprising:
determining a probability that second content associated with the second product identifier will be presented within a predetermined time interval;
determining that the probability satisfies a caching threshold; and
caching the second content at the server.

14. The method of claim 5, further comprising:
determining a set of candidate content for a first user identifier of the first set, the set of candidate content comprising second content and third content;
determining an order of presentation for the set of candidate content; and
caching the order of presentation at the server.

15. The method of claim 14, wherein the server is a first server located in a first geographic region, and wherein the first user identifier is in the first set and the second set, the method further comprising:
receiving a first bid request for a first content delivery slot, wherein the first bid request comprises the first user identifier and geographic information indicative of the first geographic region;
sending a response to the first bid request comprising the third content;
determining that the third content was presented;
receiving a second bid request for a second content delivery slot, wherein the second bid request comprises the first user identifier and geographic information indicative of a second geographic region; and
caching the third content at a second server in the second geographic region.

16. A device comprising:
at least one memory that stores computer-executable instructions; and
at least one processor configured to access the at least one memory and execute the computer-executable instructions to:
determine a first set of user identifiers for users that are eligible to be presented with content associated with a first product identifier, the first set comprising a first number of user identifiers;
determine a second set of user identifiers for users that are eligible to be presented with content associated with a second product identifier, the second set comprising a second number of user identifiers;
determine that the first number is ranked higher than the second number;
cache, based at least in part on the determination that the first number is ranked higher than the second number, first content associated with the first product identifier at a server instead of second content associated with the second product identifier;

determine that the first content has been presented to a user associated with a user identifier of the first set;

remove, based at least in part on the determination that the first content has been presented to a user, the first content from the server;

cache the second content at the server;

determine a first probability that a first bid request comprising a first user identifier that is in the first set of user identifiers will be received within a predetermined time interval;

determine a second probability that a second bid request comprising a second user identifier that is in the second set of user identifiers will be received within the predetermined time interval;

determine that the second probability satisfies a caching threshold;

determine second content associated with the second product identifier;

determine second product information associated with the second product identifier; and cache the second content and the second product information at the server.

17. The device of claim 16, wherein the at least one processor is further configured to access the at least one memory and execute the computer-executable instructions to:

receive a bid request for a content delivery slot, wherein the bid request comprises a user identifier;

determine that the first set of user identifiers comprises the user identifier;

send a response to the bid request comprising the first content and first product information associated with the first product identifier within about 40 milliseconds of receiving the bid request;

determine that the user identifier is eligible to be presented with second content associated with the second product identifier; and determine a user-specific ranking of the first content and the second content, wherein the first content is ranked higher than the second content.

18. The method of claim 8, wherein the server is a first server in a first geographic region, the method further comprising:

receiving an indication that the first content is disliked;

storing a user preference indicating that the first content is disliked at a local memory on the device; and sending a notification of the user preference to a second server in a second geographic location.

* * * * *